(12) United States Patent
Nakamura

(10) Patent No.: US 11,155,061 B2
(45) Date of Patent: Oct. 26, 2021

(54) LAMINATED GLASS

(71) Applicant: AGC Inc., Chiyoda-ku (JP)

(72) Inventor: Atsushi Nakamura, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 139 days.

(21) Appl. No.: 16/264,088

(22) Filed: Jan. 31, 2019

(65) Prior Publication Data

US 2019/0160791 A1 May 30, 2019

Related U.S. Application Data

(63) Continuation of application No. PCT/JP2017/027803, filed on Aug. 1, 2017.

(30) Foreign Application Priority Data

Aug. 5, 2016 (JP) .............................. JP2016-154407

(51) Int. Cl.
  *B32B 33/00* (2006.01)
  *B32B 17/10* (2006.01)
  *B60J 1/00* (2006.01)

(52) U.S. Cl.
  CPC .. *B32B 17/10036* (2013.01); *B32B 17/10605* (2013.01); *B32B 17/10633* (2013.01);
  (Continued)

(58) Field of Classification Search
  CPC ........ B32B 17/10036; B32B 17/10605; B32B 17/10633; B32B 17/10761;
  (Continued)

(56) References Cited

U.S. PATENT DOCUMENTS 6,720,082 B1 * 4/2004 Hashimoto ......... B32B 17/1033
  428/437
2002/0054993 A1   5/2002 Nagai
(Continued)

FOREIGN PATENT DOCUMENTS

CN     1898169 A    1/2007
JP     2001-302289  10/2001
(Continued)

OTHER PUBLICATIONS

International Search Report datedNov. 7, 2017 in PCT/JP2017/027803 filed Aug. 1, 2017 (with English Translation).
(Continued)

*Primary Examiner* — Travis M Figg
(74) *Attorney, Agent, or Firm* — Oblon, McClelland, Maier & Neustadt, L.L.P.

(57) ABSTRACT

There is provided laminated glass with a heat shielding property in which a need to change an intermediate film is reduced even though thicknesses of glass plates are changed. Laminated glass of an embodiment includes: a pair of glass plates; and an intermediate film sandwiched between this pair of glass plates. A total thickness of the pair of glass plates and the intermediate film is 3.6 mm or less. Further, a ratio ($A_2/A_1$) of an absorbance ($A_2$) of the intermediate film at the wavelength of 1500 nm to an absorbance ($A_1$) of the pair of glass plates at a wavelength of 1500 nm is 2.0 or more when plate thicknesses of the pair of glass plates are each set to 2.0 mm. Further, a solar radiation transmittance (Tts) provided by ISO13837 (2008) is 60% or less.

9 Claims, 1 Drawing Sheet

(52) U.S. Cl.
CPC ........... B32B 17/10761 (2013.01); B60J 1/00 (2013.01); *B32B 2250/03* (2013.01); *B32B 2307/30* (2013.01); *B32B 2331/04* (2013.01); *B32B 2605/006* (2013.01)

(58) Field of Classification Search
CPC ............ B32B 2250/03; B32B 2307/30; B32B 2331/04; B32B 2605/006; B60J 1/00
See application file for complete search history.

(56) References Cited

U.S. PATENT DOCUMENTS

| | | | |
|---|---|---|---|
| 2003/0026964 A1* | 2/2003 | Muromachi | B32B 17/10761 428/212 |
| 2006/0008640 A1 | 1/2006 | Chonan et al. | |
| 2007/0134487 A1* | 6/2007 | Marumoto | B32B 17/10174 428/323 |
| 2007/0154724 A1* | 7/2007 | Muromachi | B32B 17/10036 428/426 |
| 2008/0026211 A1* | 1/2008 | Nagashima | B32B 17/10036 428/339 |
| 2011/0297900 A1* | 12/2011 | Cid-Aguilar | C03C 3/087 252/588 |
| 2012/0162752 A1 | 6/2012 | Kitano et al. | |
| 2012/0164409 A1 | 6/2012 | Masaki | |
| 2013/0288061 A1* | 10/2013 | Kitano | C08K 5/07 428/437 |
| 2013/0337247 A1 | 12/2013 | Kitano et al. | |
| 2014/0377567 A1* | 12/2014 | Li | B32B 17/10651 428/432 |
| 2015/0030860 A1* | 1/2015 | Shimamoto | B32B 17/10605 428/442 |
| 2015/0158274 A1* | 6/2015 | Yabuki | B32B 27/306 428/328 |
| 2015/0258751 A1* | 9/2015 | Shimamoto | B32B 27/306 428/437 |
| 2016/0236446 A1* | 8/2016 | Nakayama | B32B 17/10761 |
| 2017/0057206 A1* | 3/2017 | Nakamura | B32B 17/10633 |

FOREIGN PATENT DOCUMENTS

| | | |
|---|---|---|
| JP | 2002-173346 | 6/2002 |
| JP | 2005-139046 | 6/2005 |
| JP | 2007-290923 | 11/2007 |
| JP | WO2011/019062 A1 | 2/2011 |
| JP | WO2011/024788 A1 | 3/2011 |
| JP | WO 2012/115198 | 8/2012 |
| WO | WO2005/087680 A1 | 9/2005 |
| WO | WO-2015046584 A1 * | 4/2015 ....... B32B 17/10761 |

OTHER PUBLICATIONS

Written Opinion dated Nov. 7, 2017 in PCT/JP2017/027803 filed Aug. 1, 2017.

* cited by examiner

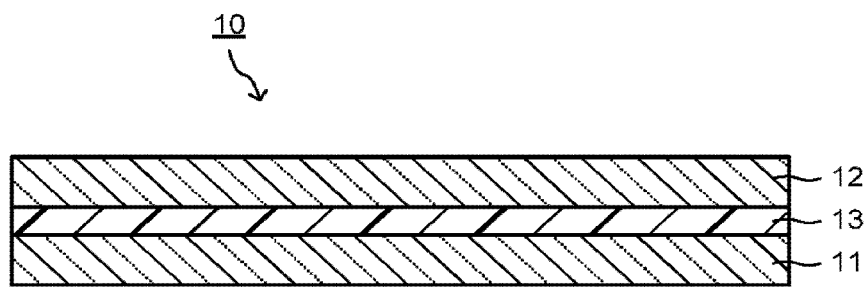

LAMINATED GLASS

CROSS-REFERENCE TO RELATED APPLICATIONS

This application is a continuation of prior International Application No. PCT/JP2017/027803, filed on Aug. 1, 2017 which is based upon and claims the benefit of priority from Japanese Patent Application No. 2016-154407, filed on Aug. 5, 2016; the entire contents of all of which are incorporated herein by reference.

FIELD

An embodiment of the present invention relates to laminated glass, and particularly to laminated glass with a heat shielding property in which a need to change an intermediate film is reduced even though thicknesses of glass plates are changed.

BACKGROUND

Conventionally, laminated glass having a structure in which an intermediate film is sandwiched between a pair of glass plates is used. In such laminated glass, because the pair of glass plates are made to adhere by the intermediate film and the intermediate film is unlikely to be damaged, fragments of the glass are unlikely to scatter when the glass is broken, which makes the laminated glass excellent in safety. Therefore, it is widely used as window glass of a vehicle such as an automobile, a building, and the like.

In recent years, laminated glass to which various functions have been imparted in addition to the safety is used. For example, laminated glass with a heat shielding property is used to suppress a temperature rise due to irradiation with infrared rays (for example, refer to JP-A 2001-302289.). In many cases, in the laminated glass with the heat shielding property, from the viewpoint of improving the heat shielding property efficiently, both members of a pair of glass plates and an intermediate film are composed of heat shielding materials.

Incidentally, for the laminated glass, a reduction in weight for the purpose of an improvement in fuel consumption or the like of an automobile is studied. In general, because the glass plate has higher density compared with that of the intermediate film and the glass plates occupy a large portion of the laminated glass, a method of reducing thicknesses of the glass plates is employed as a method for the reduction in weight.

However, in the conventional laminated glass with the heat shielding property, since both the members of the pair of glass plates and the intermediate film are composed of the heat shielding materials, reducing the thicknesses of the glass plates as the method for the reduction in weight decreases the heat shielding property of the laminated glass. In order to maintain the heat shielding property, an intermediate film having a heat shielding property according to the thicknesses of the glass plates is to be prepared, resulting in an increase in costs of development, production, management, and the like of the intermediate film.

Thus, in the conventional laminated glass with the heat shielding property, the intermediate film is to be changed according to the thicknesses of the glass plates in order to maintain the heat shielding property. Therefore, laminated glass with a heat shielding property in which a need to change the intermediate film is reduced even though the thicknesses of the glass plates are changed is required.

SUMMARY

The present invention has been made to solve the above-described problem, and is an object to provide laminated glass with a heat shielding property in which a need to change an intermediate film is reduced even though thicknesses of glass plates are changed.

Laminated glass of an embodiment includes: a pair of glass plates; and an intermediate film sandwiched between this pair of glass plates. A total thickness of the pair of glass plates and the intermediate film is 3.6 mm or less. Further, a ratio ($A_2/A_1$) of an absorbance ($A_2$) of the intermediate film at the wavelength of 1500 nm to an absorbance ($A_1$) of the pair of glass plates at a wavelength of 1500 nm is 2.0 or more when plate thicknesses of the pair of glass plates are each set to 2.0 mm. Further, a solar radiation transmittance (Tts) of the laminated glass, which is provided by ISO13837 (2008), is 60% or less.

In laminated glass of an embodiment, when plate thicknesses of a pair of glass plates are each set to 2.0 mm, a ratio ($A_2/A_1$) of an absorbance ($A_2$) of an intermediate film at the wavelength of 1500 nm to an absorbance ($A_1$) of the pair of glass plates at a wavelength of 1500 nm is 2.0 or more. Therefore, a heat shielding property of the laminated glass is secured mainly by the intermediate film, and a need to change the intermediate film is reduced even though the thicknesses of the glass plates are changed.

BRIEF DESCRIPTION OF THE DRAWING

FIG. 1 is a cross-sectional view illustrating laminated glass of one embodiment.

DETAILED DESCRIPTION

Hereinafter, an explanation will be given referring to a mode for embodying the present invention. However, without being limited by the following embodiment, modifications and the like are possible within a range of not departing from the spirit of the present invention.

FIG. 1 is a cross-sectional view illustrating laminated glass of one embodiment of the present invention.

As illustrated in FIG. 1, laminated glass 10 has a pair of glass plates 11, 12 and an intermediate film 13 sandwiched between this pair of glass plates 11, 12. For example, the intermediate film 13 is formed in the same shape and the same dimensions as those of the pair of glass plates 11, 12. Note that the intermediate film 13 may have a substantially wedge-shaped cross section when the laminated glass 10 is used as head-up display glass, for example.

A total thickness of the pair of glass plates 11, 12 and the intermediate film 13 is 3.6 mm or less. Further, when plate thicknesses of the pair of glass plates 11, 12 are each set to 2.0 mm, a ratio ($A_2/A_1$) of an absorbance ($A_2$) of the intermediate film 13 at the wavelength of 1500 nm to an absorbance ($A_1$) of the pair of glass plates at a wavelength of 1500 nm is 2.0 or more. In addition, a solar radiation transmittance (Tts) provided by ISO13837 (2008) is 60% or less. Note that an absorbance (A) at each wavelength in this embodiment is an absorbance in which the plate thicknesses of the pair of glass plates 11, 12 at the corresponding wavelength are each set to 2.0 mm and the respective absorbances in these glass plates 11, 12 are totaled in a case of the pair of glass plates 11, 12, or a single absorbance of the intermediate film 13 used in the laminated glass 10 in a case of the intermediate film 13. Further, the absorbance (A) of each part is calculated by $A=-\log_{10}T$. Here, T indicates a ratio of a transmitted light intensity I to an incident light intensity $I_0$.

Hereinafter, each of the constituent elements of the laminated glass 10 will be explained.

[Glass Plate]

The thicknesses of the glass plates 11, 12 are different depending on a composition thereof, a composition of the intermediate film, and a use of the laminated glass 10, but are each preferably 0.1 to 10 mm, and more preferably 0.3 to 2.5 mm.

The thicknesses of the glass plates 11, 12 may be the same as or different from each other. When the thicknesses are different, the glass plate serving as the outside, for example, a vehicle-exterior side in window glass of an automobile or an outdoor side in window glass of a building is preferably thicker than the glass plate serving as the inside. The glass plate serving as the outside is thick to thereby suppress damage due to a collision of a small stone or the like and improve flying stone impact resistance. Further, the glass plate serving as the inside is thin to thereby allow a reduction in weight to be achieved.

The thickness of the glass plate serving as the outside is preferably 1.0 mm or more, and more preferably 1.5 mm or more from the viewpoint of the flying stone impact resistance. The thickness of the glass plate serving as the inside is preferably 1.0 mm or less, and more preferably 0.7 mm or less from the viewpoint of the reduction in weight, or the like.

Glass forming the glass plates 11, 12 may be either of inorganic glass and organic glass. Note that the glass plates 11, 12 may be each a two or more-layer laminated one.

As the inorganic glass, there can be cited soda lime glass (also referred to as soda lime silicate glass), aluminosilicate glass, borosilicate glass, non-alkali glass, quartz glass, or the like. Among these, the soda lime glass is preferable. The inorganic glass may be float plate glass formed by a float method or the like. Further, the inorganic glass may be subjected to tempering such as air-cooling tempering or chemical tempering.

As the organic glass, there can be cited a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin, or the like. Among these, the polycarbonate resin such as an aromatic polycarbonate resin or the acrylic resin such as a polymethyl methacrylate-based acrylic resin is preferable, and the polycarbonate resin is more preferable. Further, among the polycarbonate resins, a bisphenol A-based polycarbonate resin is preferable. Note that two or more kinds of the above-described resins may be used in combination.

It is sufficient that both of the inorganic glass and the organic glass have transparency, and they may be colorless or colored. Further, the inorganic glass and the organic glass can contain an infrared shielding material, an ultraviolet shielding material, or the like.

Between the inorganic glass and the organic glass, the inorganic glass is preferable from the viewpoint of durability or the like. As the inorganic glass, as long as the ratio $(A_2/A_1)$ is 2.0 or more when it serves as the laminated glass 10, green glass, ultraviolet-absorbing (UV) green glass, or the like can also be used.

Here, the UV green glass contains 68 to 74 mass % of $SiO_2$, 0.3 to 1.0 mass % of $Fe_2O_3$, and 0.05 to 0.5 mass % of FeO, and has an ultraviolet transmittance of 1.5% or less at a wavelength of 350 nm and has a minimum value of transmittance in a region of wavelengths of 550 to 1700 nm.

In the pair of glass plates 11, 12, the absorbance $(A_1)$ at the wavelength of 1500 nm when the plate thicknesses are each set to 2.0 mm is preferably 0.40 or less. When it is 0.40 or less, the ratio $(A_2/A_1)$ is likely to be 2.0 or more. When the ratio $(A_2/A_1)$ is 2.0 or more, a heat shielding property of the laminated glass 10 is secured mainly by the intermediate film 13, and a need to change the intermediate film 13 is reduced even though the thicknesses of the glass plates 11, 12 are changed. The absorbance $(A_1)$ is preferably 0.35 or less, more preferably 0.30 or less, further preferably 0.25 or less, and particularly preferably 0.23 or less from the viewpoint of securing the heat shielding property of the laminated glass 10 by the intermediate film 13. Normally, the absorbance $(A_1)$ is 0.10 or more.

The absorbance $(A_1)$ can be adjusted by the content of the infrared shielding material to be contained in the glass. Specifically, reducing the content of the infrared shielding material to be contained in the glass makes it possible to decrease the absorbance $(A_1)$. For example, when the pair of glass plates 11, 12 are made of the inorganic glass, a metal oxide serving as a coloring component, such as an iron oxide $(Fe_2O_3)$, can be cited as the infrared shielding material. From the viewpoint of the absorbance $(A_1)$, the iron oxide $(Fe_2O_3)$ is preferably 2 mass % or less, and more preferably 1 mass % or less in the inorganic glass.

The glass plates 11, 12 may be composed of different materials, but are preferably composed of the same material. The glass plates 11, 12 may be each planer, or the whole or partial surface thereof may be curved. Further, surfaces of the glass plates 11, 12 may be subjected to various coatings. For example, the surfaces of the glass plates 11, 12 on the intermediate film 13 sides may be subjected to low-radioactive coating, infrared shielding coating, conductive coating, or the like. Further, the surfaces of the glass plates 11, 12 on sides opposite to the intermediate film 13 sides may be subjected to coating which imparts a water repellent function, a hydrophilic function, an antifogging function, or the like. When the glass plates 11, 12 are subjected to the coating, the absorbance $(A_1)$ is obtained regarding the ones subjected to the coating.

[Intermediate Film]

The intermediate film 13 makes the glass plates 11, 12 adhere thereto. Normally, the intermediate film 13 includes a thermoplastic resin. The kind of the thermoplastic resin is not particularly limited, and can be appropriately selected from among thermoplastic resins composing a publicly known intermediate film. Note that the intermediate film 13 may have a single-layer structure or a laminated structure in which two or more layers have been laminated.

As the thermoplastic resin, there can be cited a polyvinyl acetal-based resin, a polyvinyl chloride-based resin, a saturated polyester-based resin, a polyurethane-based resin, an ethylene-vinyl acetate copolymer-based resin, an ethylene-ethyl acrylate copolymer-based resin, or the like. These thermoplastic resins may be used alone or two or more kinds of them may be used in combination.

Among these, from a balance among performances such as transparency, weather resistance, strength, adhesive strength, penetration resistance, impact energy absorbency, moisture resistance, a heat shielding property, and a sound insulating property, the polyvinyl acetal-based resin is suitably used.

As the polyvinyl acetal-based resin, there can be cited a polyvinyl formal resin obtained by making polyvinyl alcohol (hereinafter, sometimes referred to as "PVA" as necessary) and formaldehyde react with each other, a polyvinyl acetal resin in a narrow sense obtained by making PVA and acetaldehyde react with each other, a polyvinyl butyral resin (hereinafter, sometimes referred to as "PVB" as necessary) obtained by making the PVA and n-butyraldehyde react with each other, or the like. These polyvinyl acetal-based resins may be used alone or two or more kinds of them may be used in combination. Among these, due to an excellent balance among the performances such as transparency, weather resistance, strength, adhesive strength, penetration resistance, impact energy absorbency, moisture resistance, a heat shielding property, and a sound insulating property, the PVB is suitably used.

An average degree of polymerization of the PVA used for synthesis of the polyvinyl acetal-based resin is preferably 200 to 5000, and more preferably 500 to 3000. Further, a degree of acetalization of the polyvinyl acetal-based resin is preferably 40 to 85 mol %, and more preferably 50 to 75 mol %. In addition, a residual acetyl group amount of the polyvinyl acetal-based resin is preferably 30 mol % or less, and more preferably 0.5 to 24 mol %.

The intermediate film 13 preferably contains a plasticizer. As the plasticizer, there can be cited a carboxylic acid ester-based plasticizer such as a monovalent carboxylic acid ester-based plasticizer or a polyvalent carboxylic acid ester-based plasticizer, a phosphoric acid ester-based plasticizer, an organic phosphorous acid ester-based plasticizer, a polymeric plasticizer such as a carboxylic acid polyester-based plasticizer, a carbonic acid polyester-based plasticizer, or a polyalkylene glycol-based plasticizer, a hydroxycarboxylic acid ester-based plasticizer such as an ester compound of a hydroxycarboxylic acid such as castor oil and a polyhydric alcohol or an ester compound of a hydroxycarboxylic acid and a monohydric alcohol, or the like.

As the monovalent carboxylic acid ester-based plasticizer, there can be cited a compound obtained by a condensation reaction of a monovalent carboxylic acid such as a butanoic acid, an isobutane acid, a hexanoic acid, a 2-ethylbutanoic acid, a heptanoic acid, an octylic acid, a 2-ethylhexanoic acid, or a lauric acid, and a polyhydric alcohol such as ethylene glycol, diethylene glycol, triethylene glycol, tetraethylene glycol, polyethylene glycol, polypropylene glycol, or glycerin. Specifically, there can be cited triethylene glycol di2-ethyl butanoate, triethylene glycol diheptanoate, triethylene glycol di2-ethylhexanoate, triethylene glycol dioctanoate, tetraethylene glycol di2-ethyl butanoate, tetraethylene glycol diheptanoate, tetraethylene glycol di2-ethylhexanoate, tetraethylene glycol dioctanoate, diethylene glycol di2-ethylhexanoate, PEG #400 di2-ethylhexanoate, triethylene glycol mono2-ethylhexanoate, the whole or partial ester compound of glycerin or diglycerin with a 2-ethylhexanoic acid, or the like. Here, PEG #400 represents polyethylene glycol having an average molecular weight of 350 to 450.

As the polyvalent carboxylic acid ester-based plasticizer, there can be cited a compound obtained by a condensation reaction of a polyvalent carboxylic acid such as an adipic acid, a succinic acid, an azelaic acid, a sebacic acid, a phthalic acid, an isophthalic acid, a terephthalic acid, or a trimellitic acid, and an alcohol having 1 to 12 carbon atoms, such as methanol, ethanol, butanol, hexanol, 2-ethylbutanol, heptanol, octanol, 2-ethylhexanol, decanol, dodecanol, butoxyethanol, butoxyethoxyethanol, or a benzyl alcohol. Specifically, there can be cited dihexyl adipate, di-2-ethylbutyl adipate, diheptyl adipate, dioctyl adipate, di2-ethylhexyl adipate, di(butoxyethyl) adipate, di(butoxyethoxyethyl) adipate, mono(2-ethylhexyl) adipate, dibutyl sebacate, dihexyl sebacate, di2-ethylbutyl sebacate, dibutyl phthalate, dihexyl phthalate, di(2-ethylbutyl) phthalate, dioctyl phthalate, di(2-ethylhexyl) phthalate, benzylbutyl phthalate, didodecyl phthalate, or the like.

As the phosphoric acid ester-based plasticizer or the organic phosphorous acid ester-based plasticizer, there can be cited a compound obtained by a condensation reaction of a phosphoric acid or a phosphorous acid, and the alcohol having 1 to 12 carbon atoms, such as methanol, ethanol, butanol, hexanol, 2-ethylbutanol, heptanol, octanol, 2-ethylhexanol, decanol, dodecanol, butoxyethanol, butoxyethoxyethanol, or a benzyl alcohol. Specifically, there can be cited trimethyl phosphate, triethyl phosphate, tripropyl phosphate, tributyl phosphate, tri(2-ethylhexyl) phosphate, tri(butoxyethyl) phosphate, tri(2-ethylhexyl) phosphite, or the like.

As the carboxylic acid polyester-based plasticizer, there is carboxylic acid polyester obtained by alternating copolymerizing a polyvalent carboxylic acid such as an oxalic acid, a malonic acid, a succinic acid, an adipic acid, a suberic acid, a sebacic acid, a dodecanoic diacid, a 1,2-cyclohexane dicarboxylic acid, a 1,3-cyclohexane dicarboxylic acid, or a 1,4-cyclohexane dicarboxylic acid, and a polyhydric alcohol such as ethylene glycol, diethylene glycol, triethylene glycol, tetraethylene glycol, 1,2-propylene glycol, 1,3-propylene glycol, 1,2-buthylene glycol, 1,3-buthylene glycol, 1,4-buthylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl)cyclohexane, 1,3-bis(hydroxymethyl)cyclohexane, or 1,4-bis(hydroxymethyl)cyclohexane, a polymer (hydroxycarboxylic acid polyester) of a hydroxycarboxylic acid such as an aliphatic hydroxycarboxylic acid, a glycolic acid, a lactic acid, a 2-hydroxybutyric acid, a 3-hydroxybutyric acid, a 4-hydroxybutyric acid, a 6-hydroxyhexanoic acid, a 8-hydroxyhexanoic acid, a 10-hydroxydecanoic acid, a 12-hydroxydodecanoic acid, a hydroxycarboxylic acid having an aromatic ring, a 4-hydroxybenzoic acid, or a 4-(2-hydroxyethyl)benzoic acid, or carboxylic acid polyester obtained by ring-opening polymerizing a lactone compound such as an aliphatic lactone compound such as γ-butyrolactone, γ-valerolactone, δ-valerolactone, β-methyl-δ-valerolactone, δ-hexanolactone, ε-caprolactone, or lactide, and a lactone compound having an aromatic ring such as phthalide. A terminal structure of each of these carboxylic acid polyesters is not particularly limited, and may have a hydroxyl group or a carboxyl group, or may have an ester bond obtained by making a terminal hydroxyl group or a terminal carboxyl group react with a monovalent carboxylic acid or a monohydric alcohol.

As the carbonic acid polyester-based plasticizer, there can be cited carbonic acid polyester obtained by alternating copolymerizing, by transesterification, a polyhydric alcohol such as ethylene glycol, diethylene glycol, triethylene glycol, tetraethylene glycol, 1,2-propylene glycol, 1,3-propylene glycol, 1,2-buthylene glycol, 1,3-buthylene glycol, 1,4-buthylene glycol, 1,2-pentanediol, 1,5-pentanediol, 2,4-pentanediol, 1,2-hexanediol, 1,6-hexanediol, 3-methyl-1,5-pentanediol, 3-methyl2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl)cyclohexane, 1,3-bis(hydroxymethyl)cyclohexane, or 1,4-bis(hydroxymethyl)cyclohexane, and carbonic acid ester such as dimethyl carbonate or diethyl carbonate. A terminal structure of each of these carbonic acid polyester compounds is not particularly limited, but advisably has a carbonic acid ester group, a hydroxyl group, or the like.

As the polyalkylene glycol-based plasticizer, there can be cited a polymer obtained by ring-opening polymerizing alkylene oxide such as ethylene oxide, propylene oxide, butylene oxide, or oxetane with a monohydric alcohol, a polyhydric alcohol, a monovalent carboxylic acid, and a polyvalent carboxylic acid being initiators.

As the hydroxycarboxylic acid ester-based plasticizer, there can be used monohydric alcohol ester of a hydroxycarboxylic acid such as methyl ricinoleate, ethyl ricinoleate, butyl ricinoleate, methyl 6-hydroxyhexanoate, ethyl 6-hydroxyhexanoate, or butyl 6-hydroxyhexanoate of a hydroxycarboxylic acid, or polyhydric alcohol ester of a hydroxycarboxylic acid such as ethylene glycol di(6-hydroxyhexanoic acid) ester, diethylene glycol di(6-hydroxyhexanoic acid) ester, triethylene glycol di(6-hydroxyhexanoic acid) ester, 3-methyl-1,5-pentanediol di(6-hydroxyhexanoic acid) ester, 3-methyl-1,5-pentanediol di(2-hydroxybutyric acid) ester, 3-methyl-1,5-pentanediol di(3-hydroxybutyric acid) ester, 3-methyl-1,5-pentanediol di(4-hydroxybutyric acid) ester, triethylene glycol di(2-hydroxybutyric acid) ester, glycerin tri(ricinoleic acid) ester, L-tartaric acid di(1-(2-ethylhexyl)), or castor oil, or other than the above, there can also be used a compound in which a group derived from a carboxylic acid not containing a hydroxyl group or a hydrogen atom is substituted for a group derived from a hydroxycarboxylic acid in a polyhydric alcohol ester of a hydroxycarboxylic acid. And the ones obtained conventionally by a publicly known method can be used as these hydroxycarboxylic acid esters.

The intermediate film 13 preferably contains an infrared shielding material from the viewpoint of setting the ratio ($A_2/A_1$) to 2.0 or more. It is sufficient that the infrared shielding material is capable of shielding infrared rays, and publicly known infrared shielding materials can be used. Further, as the publicly known infrared shielding materials, both of inorganic and organic infrared shielding materials can be used, and these can be used in combination.

As the inorganic infrared shielding material, a dye, a fine particle, or the like can be cited. As the dye, there can be cited a cobalt-based, iron-based, chrome-based, titanium-based, vanadium-based, zirconium-base, molybdenum-based, ruthenium-based, platinum-based, or the like. As the fine particle, there can be cited a fine particle of a tin-doped indium oxide (ITO), an antimony-doped tin oxide (ATO), a composite tungsten oxide, or the like.

As the organic infrared shielding material, there can be cited a diimonium-based, anthraquinone-based, aminium-based, cyanine-based, merocyanine-based, cloconium-based, squarylium-based, azlenium-based, polymethine-based, naphthoquinone-based, pyrylium-based, phthalocyanine-based, naphthalocyanine-based, naphtholactam-based, azo-based, condensed azo-based, indigo-based, perinone-based, perylene-based, dioxazine-based, quinacridone-based, isoindolinone-based, quinophthalone-based, pyrrole-based, thioindigo-based, metal complex-based, dithiol metal complex-based, indole phenol-based, triarylmethane-based, or the like.

Among these, from the viewpoint of economic efficiency and the height of a shielding property in an infrared region with respect to a visible light region, the ITO fine particle, the ATO fine particle, the composite tungsten oxide fine particle, or the phthalocyanine-based dye is preferable. These may be used alone, or two or more kinds of these may be used in combination.

The ITO fine particle and the ATO fine particle may be a hexagonal crystal without being limited to a cubic crystal having a high infrared shielding property. The ITO fine particle and the ATO fine particle can be produced by a publicly known manufacturing method. As the manufacturing method, there can be cited a mechanochemical method, a CVD method, a vapor disposition method, a sputtering method, a thermal plasma method, a laser method, a thermal decomposition method, a chemical reduction method, an electrolysis method, an ultrasonic method, a laser ablation method, a supercritical fluid method, a microwave synthesis method, or the like.

As the composite tungsten oxide fine particle, there can be cited a fine particle composed of the composite tungsten oxide represented by a general formula: $M_xW_yO_z$ (then, M represents at least one kind of element selected from Cs, Rb, K, Tl, In, Ba, Li, Ca, Sr, Fe, and Sn, W represents tungsten, and O represents oxygen, and x, y, and z satisfy $0.001 \le x/y \le 1.0$, $2.2 \le z/y \le 3.0$).

The composite tungsten oxide fine particle is excellent in infrared shielding performance because a sufficient amount of free electrons is generated. The composite tungsten oxide fine particle preferably includes one or more crystal structures selected from a hexagonal crystal, a tetragonal crystal, and a cubic crystal from excellent durability.

A molar ratio (x/y) is preferably about 0.33. The molar ratio (x/y) theoretically calculated from the crystal structure of the hexagonal crystal is 0.33, and when a value is close to this, an optical characteristic becomes preferable. As the one described above, there can be cited $Cs_{0.33}WO_3$, $Rb_{0.33}WO_3$, $K_{0.33}WO_3$, $Ba_{0.33}WO_3$, or the like.

The composite tungsten oxide fine particle can be produced by a publicly known method. For example, a raw material mixture is produced by mixing a solution containing tungsten, such as an aqueous ammonium tungstate solution or a tungsten hexachloride solution, and a solution of chloride salt, nitrate, sulfate, oxalate, an oxide, or the like of each of elements represented by M at a predetermined ratio. Heat-treating this raw material mixture in an inert gas atmosphere or a reducing gas atmosphere makes it possible to obtain the composite tungsten oxide fine particle.

A surface of the composite tungsten oxide fine particle is preferably covered by an oxide of a metal selected from Si, Ti, Zr, Al, and so on from the viewpoint of weather resistance. The covering can be performed by adding an alkoxide of the above-described metal in a solution in which the composite tungsten oxide fine particles have been dispersed, for example.

An average primary particle size of the ITO fine particle, the ATO fine particle, or the composite tungsten oxide fine particle is preferably 100 nm or less. The average primary particle size of 100 nm or less leads to suppression of a haze due to scattering of light and excellent transparency. The average primary particle size is more preferably 50 nm or less, and further preferably 30 nm or less. A lower limit of the average primary particle size is not particularly limited, but the one having about 2 nm can also be produced by the present technology. Here, the average primary particle size of the fine particle means the one measured from an observation image by a transmission electron microscope.

The phthalocyanine-based dye exhibits steep absorption in a near-infrared wavelength region. For this reason, for example, use in combination with the ITO fine particle, the ATO fine particle, the composite tungsten oxide fine particle, or the like makes it possible to obtain the infrared shielding property in a wide range.

The infrared shielding material preferably has 0.01 mass % or more in the intermediate film 13. When it is 0.01 mass % or more, the infrared shielding property effectively improves. The infrared shielding material more preferably has 0.05 mass % or more, and further preferably has 0.07 mass % or more. On the other hand, when it is 2.0 mass % or less, a visible light transmittance (Tv) is easily secured. The infrared shielding material more preferably has 1.5 mass % or less, and further preferably has 1.3 mass % or less.

The intermediate film 13 can contain an ultraviolet shielding material. As the ultraviolet shielding material, there can be cited a benzotriazole-based, hindered amine-based, benzoate-based, triazine-based, benzophenone-based, malonic ester-based, oxanilide-based, or the like ultraviolet shielding material.

As the benzotriazole-based ultraviolet shielding material, there can be cited 2-(5-chloro-2-benzotriazolyl)-6-tert-butyl-p-cresol, 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl) benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, 2-(2'-hydroxy-5'-t-octylphenyl)benzotriazole, or the like.

As the hindered amine-based ultraviolet shielding material, there can be cited 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butyl malonate, 4-(3-(3,5-di-t-butyl-4-hydroxyphenyl)propionyloxy)-1-(2-(3-(3,5-di-t-butyl-4-hydroxyphen yl)propionyloxy)ethyl)-2,2,6,6-tetramethylpiperidine, or the like.

As the benzoate-based ultraviolet shielding material, there can be cited 2,4-di-t-butylphenyl-3,5-di-t-butyl-4-hydroxybenzoate, hexadecyl-3,5-di-t-butyl-4-hydroxybenzoate, or the like.

As the triazine-based ultraviolet shielding material, there can be cited 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, 2-octylthio-4,6-bis-(3,5-di-t-butyl-4-oxyanilino)-1,3,5-triazine, or the like.

As the benzophenone-based ultraviolet shielding material, there can be cited 2-hydroxy-4-methoxybenzophenone, 2,2'-dihydroxy-4-methoxybenzophenone, 2-hydroxy-4-methoxy-2-carboxybenzophenone, 2-hydroxy-4-n-octoxy-benzophenone, or the like.

As the malonic ester-based ultraviolet shielding material, there can be cited 2-(p-methoxybenzylidene) dimethyl malonate, tetraethyl-2,2-(1,4-phenylenedimethylidene)bis-malonate, 2-(p-methoxybenzylidene)-bis(1,2,2,6,6-pentamethyl4-piperidinyl)malonate, or the like.

As the oxanilide-based ultraviolet shielding material, there can be cited oxalic diamides each having an aryl group or the like substituted on a nitrogen atom such as N-(2-ethylphenyl)-N'-(2-ethoxy-5-t-butylphenyl)oxalic diamide, N-(2-ethylphenyl)-N'-(2-ethoxy-phenyl)oxalic diamide, 2-ethyl-2'-ethoxy-oxyanilide or the like.

The intermediate film 13 can further contain an adhesion regulator, an antioxidant, a coupling agent, a surface-active agent, a heat stabilizer, a light stabilizer, a dehydrating agent, a defoaming agent, an antistatic agent, a flame retarder, or the like.

As the adhesion regulator, an alkali metal salt or an alkali earth metal salt can be cited. Specifically, a salt of potassium, sodium, magnesium, or the like can be cited. As the above-described salt, there can be cited a salt of an organic acid such as a carboxylic acid such as an octanoic acid, a hexanoic acid, a butyric acid, an acetic acid, or a formic acid or an inorganic acid such as a hydrochloric acid or a nitric acid, or the like.

As the antioxidant, there can be cited a phenol-based, phosphorus-based, sulfur-based, or the like antioxidant.

As the phenol-based antioxidant, there can be cited an acrylate-based compound such as 2-t-butyl-6-(3-t-butyl-2-hydroxy-5-methylbenzyl)-4-methylphenyl acrylate or 2,4-di-t-amyl-6-(1-(3,5-di-t-amyl-2-hydroxyphenyl)ethyl)phenyl acrylate, or an alkyl-substituted phenol-based compound such as 2,6-di-t-butyl-4-methylphenol, 2,6-di-t-butyl-4-ethylphenol, octadecyl-3-(3,5-)di-t-butyl-4-hydroxyphenyl) propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl) methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5-tris(4-tert-butyl-3-hydroxy-2,6-dimethylbenzyl)-1,3,5-triazine-2,4,6-(1H,3H,5H)-trione, 1,3,5-trimethyl-2,4,6-tris(3,5-di-t-butyl-4-hydroxybenzyl) benzene, tetrakis(methylene-3-(3',5'-di-t-butyl-4'-hydroxyphenyl)propionate)methane, or triethylene glycol bis(3-(3-t-butyl-4-hydroxy-5-methylphenyl)propionate), or the like.

As the phosphorous-based antioxidant, there can be cited a monophosphite-based compound such as tris(2,4-di-t-butylphenyl) phosphite, triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(cyclohexyl phenyl) phosphite, 2,2-methylene bis(4,6-di-t-butylphenyl) octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, or 10-decyl oxy-9,10-dihydro-9-oxa-10-phosphaphenanthrene, a diphosphite-based compound such as 4,4'-butylidene-bis (3-methyl-6-t-butylphenyl-di-tridecyl phosphite), 4,4'-isopropylidene-bis(phenyl-di-alkyl (the number of carbon atoms of not less than 12 nor more than 15) phosphite)4,4'-isopropylidene-bis(diphenyl monoalkyl (the number of carbon atoms of not less than 12 nor more than 15) phosphite), 1,1,3-tris(2-methyl-4-di-tridecyl phosphite-5-t-butylphenyl) butane, or tetrakis(2,4-di-t-butylphenyl)-4,4'-biphenylene phosphite, or the like.

As the sulfur-based antioxidant, there can be cited dilauryl3,3'-thiodipropionate, distearyl3,3-thiodipropionate, lauryl stearyl3,3'-thiodipropionate, pentaerythritol-tetrakis-(β-lauryl-thiopropionate), 3,9-bis(2-dodecylthioethyl)-2,4,8,10-tetraoxaspiro[5.5]undecane, or the like.

A thickness of the intermediate film 13 is preferably 100 μm or more. When it is 100 μm or more, penetration resistance, a sound insulating property, and the like become good. The thickness of the intermediate film 13 is more preferably 200 μM or more, and further preferably 300 μm or more. Further, from the viewpoint of reducing a thickness of the laminated glass 10, the thickness is preferably 2000 µm or less, more preferably 1900 µm or less, and further preferably 1800 µm or less.

The intermediate film 13 preferably has a storage modulus G' of $5.0 \times 10^4$ Pa or more measured at a frequency of 1 Hz and a temperature of 20° C. The storage modulus G' is an index indicating rigidity, and when it is $5.0 \times 10^4$ Pa or more, the rigidity is easily secured. The storage modulus G' is more preferably $1.0 \times 10^5$ Pa or more.

An upper limit of the storage modulus G' is not necessarily limited. However, an increase in the storage modulus G' requires a specific device for a process of cutting or the like, and makes the intermediate film 13 brittle to thereby decrease the penetration resistance. From the above viewpoint, the storage modulus G' is preferably $1.0 \times 10^7$ Pa or less.

Note that the storage modulus G' in this specification is a storage modulus in a dynamic viscoelasticity test measured under conditions of a frequency of 1 Hz, a temperature of 20° C., and a dynamic shear strain of 0.015% by a shearing method, for example, by using Rheometer MCR 301 manufactured by Anton paar GmbH.

In the intermediate film 13, the absorbance ($A_2$) at the wavelength of 1500 nm is preferably 0.80 or more. In a case of 0.80 or more, the ratio ($A_2/A_1$) is likely to be 2.0 or more. When the ratio ($A_2/A_1$) is 2.0 or more, the heat shielding property of the laminated glass 10 is secured mainly by the intermediate film 13, and the need to change the intermediate film 13 is reduced even though the thicknesses of the glass plates 11, 12 are changed. The absorbance ($A_2$) is more preferably 0.6 or more, further preferably 0.7 or more, particularly preferably 0.8 or more, and the most preferably 0.9 or more from the viewpoint of securing the heat shielding property of the laminated glass 10 by the intermediate film 13. Normally, the absorbance ($A_2$) is 1.50 or less.

The absorbance ($A_2$) can be adjusted by the content of the infrared shielding material to be contained in the intermediate film 13. For example, increasing the content of the infrared shielding material makes it possible to increase the absorbance ($A_2$).

The total thickness of the pair of glass plates 11, 12 and the intermediate film 13 is 3.6 mm or less. When it is 3.6 mm or less, the reduction in weight can be achieved. The thickness is preferably 3.3 mm or less, and more preferably 3.0 mm or less.

When the plate thicknesses of the pair of glass plates 11, 12 are each set to 2.0 mm, the ratio ($A_2/A_1$) of the absorbance ($A_2$) of the intermediate film 13 at the wavelength of 1500 nm to the absorbance ($A_1$) of the pair of glass plates at the wavelength of 1500 nm is 2.0 or more. When the ratio ($A_2/A_1$) is 2.0 or more, the heat shielding property of the laminated glass 10 is secured mainly by the intermediate film 13, and the need to change the intermediate film 13 is reduced even though the thicknesses of the glass plates 11, 12 are changed. The ratio ($A_2/A_1$) is preferably 2.5 or more, more preferably 3.0 or more, further preferably 3.5 or more, and particularly preferably 4.0 or more from the viewpoint of securing the heat shielding property of the laminated glass 10 by the intermediate film 13. Normally, the ratio ($A_2/A_1$) is preferably 10.0 or less.

The ratio ($A_2/A_1$) can be adjusted by the absorbance ($A_1$) and the absorbance ($A_2$). For example, decreasing the absorbance ($A_1$) and increasing the absorbance ($A_2$) with respect to conventional laminated glass allow the ratio ($A_2/A_1$) to be set to 2.0 or more.

The absorbance ($A_1$) can be adjusted by the content of the infrared shielding material to be contained in the glass as already described. Further, the absorbance ($A_2$) can be adjusted by the content of the infrared shielding material to be contained in the intermediate film 13 as already described.

In addition, in the laminated glass 10, the solar radiation transmittance (Tts) provided by ISO13837 (2008) is 60% or less. When the solar radiation transmittance (Tts) is 60% or less, the laminated glass 10 becomes suitable for window glass for building, window glass for automobile, and the like. The solar radiation transmittance (Tts) is more preferably 59% or less, more preferably 58% or less, and further preferably 57% or less. Normally, the solar radiation transmittance (Tts) is preferably 50% or more.

The laminated glass 10 preferably has characteristics as described below further.

A visible light transmittance (Tv) provided by JIS R3106 (1998) is preferably 70% or more. When the visible light transmittance (Tv) is 70% or more, the laminated glass 10 becomes suitable for the window glass for building, the window glass for automobile, and the like. The visible light transmittance (Tv) is more preferably 71% or more, further preferably 72% or more, and further preferably 73% or more. Normally, it is sufficient that the visible light transmittance (Tv) is 90%.

When the plate thicknesses of the pair of glass plates 11, 12 are each set to 2.0 mm, a ratio ($A_4/A_3$) of an absorbance ($A_4$) of the intermediate film 13 at 570 nm to an absorbance ($A_3$) of the pair of glass plates at a wavelength of 570 nm is preferably 0.5 or more. In a case where the ratio ($A_4/A_3$) is 0.5 or more, even though the thicknesses of the glass plates 11, 12 are changed, the visible light transmittance (Tv) does not greatly change to thus reduce the need to change the intermediate film 13. The ratio ($A_4/A_3$) is preferably 0.6 or more, and more preferably 0.65 or more.

Further, a value of a product of the ratio ($A_2/A_1$) of the absorbance ($A_2$) of the intermediate film 13 at 1500 nm to the absorbance ($A_1$) of the pair of glass plates at the wavelength of 1500 nm when the plate thicknesses of the pair of glass plates 11, 12 are each set to 2.0 mm and the ratio ($A_4/A_3$) of and the absorbance ($A_4$) of the intermediate film 13 at 570 nm to the absorbance ($A_3$) of the pair of glass plates at the wavelength of 570 nm when the plate thicknesses of the pair of glass plates 11, 12 are each set to 2.0 mm is preferably 1.0 or more. In a case where the corresponding value of the product is 1.0 or more, even though the thicknesses of the glass plates 11, 12 are changed, the heat shielding property and the visible light transmittance (Tv) do not greatly change to thus reduce the need to change the intermediate film 13. The value of the product (($A_2/A_1$)×($A_4/A_3$)) of the ratio ($A_2/A_1$) and the ratio ($A_4/A_3$) is more preferably 2.0 or more, and further preferably 3.0 or more.

In the laminated glass 10, its surface density is preferably 13.5 kg/m² or less. When the surface density is 13.5 kg/m² or less, the laminated glass 10 is reduced in weight. The surface density is more preferably 12 kg/m² or less, and further preferably 11 kg/m² or less. Further, it is preferably 8 kg/m² or more, and more preferably 9 kg/m² or more from the viewpoint of maintaining strength.

In the laminated glass 10, its three-point bending rigidity is preferably 100 N/mm or more. The three-point bending rigidity is rigidity obtained by a three-point bending test, and can be measured by, for example, a compression and tensile testing machine. The three-point bending rigidity is particularly preferably 120 N/mm or more. As long as the three-point bending rigidity is 100 N/mm or more, the laminated glass 10 becomes suitable for the window glass for building, the window glass for automobile, and the like.

The laminated glass 10 can be produced by a publicly known method. That is, a precursor is produced by disposing the intermediate film 13 between the pair of glass plates 11, 12. This precursor is inserted into a vacuum bag such as a rubber bag and thereafter subjected to preliminary compression bonding at a temperature of about 70 to 110° C. while pressure-reduction suction (deaeration) is being performed so that the pressure in the vacuum bag becomes a pressure reduction degree of about −65 to −100 kPa (an absolute pressure of about 36 to 1 kPa). Furthermore, the precursor subjected to this preliminary compression bonding is put in an autoclave and subjected to main compression bonding at a temperature of about 120 to 150° C. at a pressure of about 0.98 to 1.47 MPa. This makes it possible to obtain the laminated glass 10 in which the pair of glass plates 11, 12 are made to adhere by the intermediate film 13.

Note that although an illustration is not made, a band-shaped ceramic shielding layer can be provided for the laminated glass 10 along an outer edge portion as necessary. When the laminated glass 10 is used as, for example, the window glass for automobile, the ceramic shielding layer is provided to prevent parts disposed in an automobile from deteriorating due to irradiation of ultraviolet rays and to improve design by preventing the parts disposed in the automobile from being seen.

Normally, the ceramic shielding layer is provided for one glass plate selected from the pair of glass plates 11, 12. The ceramic shielding layer can be formed by mixing, for example, low-melting-point glass powder, pigment powder, resin, a solvent, and so on to make paste, thereafter coating the paste on the glass plate by printing or the like, and performing staining.

EXAMPLES

Hereinafter, the present invention will be described in more detail by examples. Note that the present invention is not limited to examples described below.

Reference Example 1

Laminated glass in which an intermediate film (a thickness of 760 μm) was disposed between a first glass plate (a thickness of 2.0 mm) and a second glass plate (a thickness of 0.5 mm) was produced (laminated glass R1).

The first glass plate and the second glass plate were each made of inorganic glass containing an iron oxide ($Fe_2O_3$) as an infrared shielding material. The concentration of the infrared shielding material was set to 0.5 mass % in the inorganic glass.

The intermediate film was composed of a thermoplastic resin, a plasticizer, and the infrared shielding material. The infrared shielding material was set as CWO (cesium tungstate). Further, the concentration of the infrared shielding material was set to 0.075 mass % in the intermediate film.

Separately, another laminated glass was produced similarly to the laminated glass R1 as an evaluation glass R1. The evaluation glass R1 has a thickness of the second glass plate of 2.0 mm without changing the concentration of the infrared shielding material. Parts of each of the first glass plate, the second glass plate, and the intermediate film are cut out respectively such that one part of each of them positioned at different from one another when they are laminated is exposed as a single layer. This evaluation glass R1 is intended to evaluate characteristics of the laminated glass R1.

Table 1 presents an absorbance of each of the parts in the evaluation glass R1.

Here, an absorbance ($A_1$) is the sum of absorbances of the first glass plate and the second glass plate at a wavelength of 1500 nm, an absorbance ($A_2$) is the sum of absorbances of the intermediate film at the wavelength of 1500 nm, and a ratio ($A_2/A_1$) is a ratio of the absorbance ($A_2$) to the absorbance ($A_1$).

Further, an absorbance ($A_3$) is the sum of absorbances of the first glass plate and the second glass plate at a wavelength of 570 nm, an absorbance ($A_4$) is the sum of absorbances of the intermediate film at the wavelength of 570 nm, and a ratio ($A_4/A_3$) is a ratio of the absorbance ($A_3$) to the absorbance ($A_4$).

Reference Example 2

As presented in Table 1, except for changing the concentration of the infrared shielding material in the first glass plate and the second glass plate to 1.2 times the concentration of the infrared shielding material in those in Reference Example 1, laminated glass was produced similarly to the laminated glass R1 in Reference Example 1 (laminated glass R2).

Separately, another laminated glass was produced similarly to the laminated glass R2 as an evaluation glass R2. The evaluation glass R2 has a thickness of the second glass plate of 2.0 mm without changing the concentration of the infrared shielding material. Parts of each of the first glass plate, the second glass plate, and the intermediate film are cut out respectively such that one part of each of them positioned at different from one another when they are laminated is exposed as a single layer. This evaluation glass R2 is intended to evaluate characteristics of the laminated glass R2.

Table 1 presents an absorbance of each of the parts in the evaluation glass R2.

Example 1

As presented in Table 1, except for changing the concentration of the infrared shielding material in the first glass plate and the second glass plate to 0.9 times the concentration of the infrared shielding material in those in Reference Example 1 and changing the concentration of the infrared shielding material in the intermediate film to 1.4 times the concentration of the infrared shielding material in that in Reference Example 1, laminated glass was produced similarly to the laminated glass R1 in Reference Example 1 (laminated glass 1).

Separately, another laminated glass was produced similarly to the laminated glass 1 as an evaluation glass 1. The evaluation glass 1 has a thickness of the second glass plate of 2.0 mm without changing the concentration of the infrared shielding material. Parts of each of the first glass plate, the second glass plate, and the intermediate film are cut out respectively such that one part of each of them positioned at different from one another when they are laminated is exposed as a single layer. Note that this evaluation glass 1 is laminated glass intended to obtain an absorbance and the later-described visible light transmittance difference ($Tv_1 - Tv_2$) and solar radiation transmittance difference ($Tts_1 - Tts_2$).

Table 1 presents an absorbance of each of the parts in the evaluation glass 1.

Example 2

As presented in Table 1, except for changing the concentration of the infrared shielding material in the first glass plate and the second glass plate to 0.5 times the concentration of the infrared shielding material in those in Reference Example 1 and changing the concentration of the infrared shielding material in the intermediate film to 2 times the concentration of the infrared shielding material in that in Reference Example 1, laminated glass was produced similarly to the laminated glass R1 in Reference Example 1 (laminated glass 2).

Separately, another laminated glass was produced similarly to the laminated glass 2 as an evaluation glass 2. The evaluation glass 2 has a thickness of the second glass plate of 2.0 mm without changing the concentration of the infrared shielding material. Parts of each of the first glass plate, the second glass plate, and the intermediate film are cut out respectively such that one part of each of them positioned at different from one another when they are laminated is exposed as a single layer. Note that this evaluation glass 2 is laminated glass intended to obtain an absorbance and the later-described visible light transmittance difference ($Tv_1$-$Tv_2$) and solar radiation transmittance difference ($Tts_1$-$Tts_2$).

Table 1 presents an absorbance of each of the parts in the evaluation glass 2.

Example 3

As presented in Table 1, except for changing the concentration of the infrared shielding material in the first glass plate and the second glass plate to 0.75 times the concentration of the infrared shielding material in those in Comparative Example 1, laminated glass was produced similarly to the laminated glass 1 in Example 1 (laminated glass 3).

Separately, another laminated glass was produced similarly to the laminated glass 3 as an evaluation glass 3. The evaluation glass 3 has a thickness of the second glass plate of 2.0 mm without changing the concentration of the infrared shielding material. Parts of each of the first glass plate, the second glass plate, and the intermediate film are cut out respectively such that one part of each of them positioned at different from one another when they are laminated is exposed as a single layer. Note that this evaluation glass 3 is laminated glass intended to obtain the later-described absorbance, visible light transmittance difference ($Tv_1$-$Tv_2$), and solar radiation transmittance difference ($Tts_1$-$Tts_2$).

Table 1 presents an absorbance of each of the parts in the evaluation glass 3.

Next, regarding each of the pieces of the laminated glass 1 to 3 and R1 to R2 in Examples 1 to 3 and Reference Examples 1, 2, the visible light transmittance ($Tv_1$) provided by JIS R3106 (1998) and the solar radiation transmittance ($Tts_1$) provided by ISO13837 (2008) were measured.

Further, regarding each of the pieces of the evaluation glass 1 to 3 and R1 to R2 in Examples 1 to 3 and Reference Examples 1, 2, the visible light transmittance ($Tv_2$) provided by JIS R3106 (1998) and the solar radiation transmittance ($Tts_2$) provided by ISO13837 (2008) were measured.

Then, the visible light transmittance difference ($Tv_1$-$Tv_2$) was calculated from the visible light transmittance ($Tv_1$) and the visible light transmittance ($Tv_2$), and the solar radiation transmittance difference ($Tts_1$-$Tts_2$) was calculated from the solar radiation transmittance ($Tts_1$) and the solar radiation transmittance ($Tts_2$).

Table 1 presents the visible light transmittance ($Tv_1$), the solar radiation transmittance ($Tts_1$), the visible light transmittance ($Tv_2$), the solar radiation transmittance ($Tts_2$), the visible light transmittance difference ($Tv_1$-$Tv_2$), and the solar radiation transmittance difference ($Tts_1$-$Tts_2$). Further, as a judgment, the one having a visible light transmittance difference ($Tv_1$-$Tv_2$) of 3% or less and a solar radiation transmittance difference ($Tts_1$-$Tts_2$) of 3% or less was indicated as "AA", the one having a solar radiation transmittance difference ($Tts_1$-$Tts_2$) of 3% or less was indicated as "A", and the one other than these was indicated as "B".

TABLE 1

|  |  |  | Reference example | | Example | | |
|---|---|---|---|---|---|---|---|
|  |  |  | 1 | 2 | 1 | 2 | 3 |
| Concentration of infrared shielding material*[1] |  | First glass plate | 1 | 1.2 | 0.9 | 0.5 | 0.75 |
|  |  | Second glass plate | 1 | 1.2 | 0.9 | 0.5 | 0.75 |
|  |  | Intermediate film | 1 | 1 | 1.4 | 2 | 2 |
| Absorbance of each part of evaluation glass*[2] | Absorbance (1500 nm) | Glass plate ($A_1$) | 0.30 | 0.57 | 0.27 | 0.17 | 0.23 |
|  |  | Intermediate film ($A_2$) | 0.52 | 0.52 | 0.72 | 1.03 | 1.03 |
|  |  | Ratio ($A_2/A_1$) | 1.74 | 0.91 | 2.63 | 6.01 | 4.42 |
|  | Absorbance (570 nm) | Glass plate ($A_3$) | 0.09 | 0.15 | 0.09 | 0.07 | 0.08 |
|  |  | Intermediate film ($A_4$) | 0.03 | 0.03 | 0.04 | 0.06 | 0.06 |
|  |  | Ratio ($A_4/A_3$) | 0.32 | 0.20 | 0.49 | 0.91 | 0.73 |
|  | ($A_2/A_1$) × ($A_4/A_3$) |  | 0.57 | 0.18 | 1.30 | 5.47 | 3.23 |
| Laminated glass*[3] |  | $Tv_1$[%] | 79.0 | 78.0 | 76.3 | 77.0 | 75.0 |
|  |  | $Tts_1$[%] | 59.8 | 58.4 | 56.3 | 55.0 | 54.0 |
| Evaluation glass*[2] |  | $Tv_2$[%] | 74.0 | 73.4 | 72.8 | 75.0 | 72.6 |
|  |  | $Tts_2$[%] | 55.0 | 54.3 | 53.2 | 54.0 | 52.0 |
| $Tv_1$ - $Tv_2$[%] |  |  | 5.0 | 4.6 | 3.6 | 2.0 | 2.4 |
| $Tts_1$ - $Tts_2$[%] |  |  | 4.8 | 4.1 | 3.0 | 1.0 | 2.0 |
| Judgment |  |  | B | B | A | AA | AA |

*[1] a relative value based on Reference Example 1 is indicated.
*[2] a thickness of the first glass plate is 2.0 mm, and a thickness of the second glass plate is 2.0 mm.
*[3] a thickness of the first glass plate is 2.0 mm, and a thickness of the second glass plate is 0.5 mm.

In a case where such a ratio ($A_2/A_1$) as the pieces of the evaluation glass 1 to 3 in Examples 1 to 3 each indicate is 2.0 or more, even though a thickness of the second glass plate is small, the solar radiation transmittance difference ($Tts_1-Tts_2$) is 3% or less, resulting in suppression of an increase in the solar radiation transmittance ($Tts_1$). Further, when $A_2/A_1$ is equal to or more than a predetermined value, the visible light transmittance ($Tv_1$) can also be secured.

On the other hand, in a case where such a ratio ($A_2/A_1$) as Reference Examples 1, 2 each indicate is less than 2.0, when a thickness of the second glass plate is small, the solar radiation transmittance difference ($Tts_1-Tts_2$) exceeds 3%, resulting in a significant increase in the solar radiation transmittance ($Tts_1$).

As described above, when the ratio ($A_2/A_1$) is 2.0 or more, an effect that the thicknesses of the glass plates have on the solar radiation transmittance ($Tts_1$) is reduced. This reduces a need for a change of an intermediate film when thicknesses of glass plates are changed, and makes it possible to suppress an increase in costs of development, production, management, and the like of the intermediate film.

What is claimed is:

1. A laminated glass, comprising:
a pair of glass plates; and
an intermediate film sandwiched between the pair of glass plates,
wherein:
a total thickness of the pair of glass plates and the intermediate film is 3.6 mm or less,
a ratio ($A_2/A_1$) of an absorbance ($A_2$) of the intermediate film at a wavelength of 1500 nm to an absorbance ($A_1$) of the pair of glass plates at a wavelength of 1500 nm is 2.0 or more when plate thicknesses of the pair of glass plates are each set to 2.0 mm,
a solar radiation transmittance (Tts) of the laminated glass, which is provided by ISO13837 (2008), is 60% or less, and
a content of $Fe_2O_3$ present in the glass plates is less than or equal to 0.45 wt %.

2. The laminated glass according to claim 1, wherein the absorbance ($A_1$) is 0.40 or less.

3. The laminated glass according to claim 1, wherein the absorbance ($A_2$) is 0.80 or more.

4. The laminated glass according to claim 1,
wherein a ratio ($A_4/A_3$) of an absorbance ($A_4$) of the intermediate film at a wavelength of 570 nm to an absorbance ($A_3$) of the pair of glass plates at a wavelength of 570 nm is 0.5 or more when plate thicknesses of the pair of glass plates are each set to 2.0 mm.

5. The laminated glass according to claim 4, wherein a value of a product (($A_2/A_1$)×($A_4/A_3$)) of the ratio ($A_2/A_1$) and the ratio ($A_4/A_3$) is 1.0 or more.

6. The laminated glass according to claim 1, wherein a visible light transmittance (Tv) provided by JIS R3106 (1998) is 70% or more.

7. The laminated glass according to claim 1, which has a solar radiation transmittance difference ($Tts_1-Tts_2$) of 3% or less,
wherein:
a solar radiation transmittance $Tts_1$ is determined when a plate thickness of one glass plate of the pair of glass plates is set to 2.0 mm, and that of the other glass plate of the pair of glass plates is set to 0.5 mm, and
a solar radiation transmittance $Tts_2$ is measured when plate thicknesses of the pair of glass plates are each set to 2.0 mm.

8. The laminated glass according to claim 1, which has a visible light transmittance difference ($Tv_1-Tv_2$) of 3% or less,
wherein:
a visible light transmittance $Tv_1$ is determined when a plate thickness of one glass plate of the pair of glass plates is set to 2.0 mm, and that of the other glass plate of the pair of glass plates is set to 0.5 mm, and
a visible light transmittance $Tv_2$ is measured when plate thicknesses of the pair of glass plates are each set to 2.0 mm.

9. The laminated glass according to claim 1, wherein the ratio ($A_2/A_1$) of the pair of glass plates at a wavelength of 1500 nm is 2.0 to 10.0 when plate thicknesses of the pair of glass plates are each set to 2.0 mm.

* * * * *